(12) United States Patent
Werni et al.

(10) Patent No.: US 8,646,573 B2
(45) Date of Patent: Feb. 11, 2014

(54) EXHAUST GAS TREATMENT DEVICE

(75) Inventors: Marcus Werni, Waiblingen (DE);
Andreas Sauer, Eislingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 324 days.

(21) Appl. No.: 13/033,070

(22) Filed: Feb. 23, 2011

(65) Prior Publication Data

US 2011/0203692 A1 Aug. 25, 2011

(30) Foreign Application Priority Data

Feb. 24, 2010 (DE) .................. 10 2010 008 999

(51) Int. Cl.
*F01N 1/08* (2006.01)
(52) U.S. Cl.
USPC ............................................. 181/268; 60/299
(58) Field of Classification Search
USPC ........................................... 181/268; 60/299
See application file for complete search history.

(56) References Cited

U.S. PATENT DOCUMENTS

| | | | | |
|---|---|---|---|---|
| 3,593,499 | A | * | 7/1971 | Kile ................................. 96/138 |
| 4,842,096 | A | * | 6/1989 | Fujitsubo ...................... 181/252 |
| 5,016,438 | A | | 5/1991 | Harris |
| 5,808,245 | A | * | 9/1998 | Wiese et al. .................. 181/255 |
| 6,868,670 | B1 | | 3/2005 | Schellin |
| 2005/0115229 | A1 | | 6/2005 | Worner et al. |
| 2006/0157296 | A1 | | 7/2006 | Belisle |
| 2007/0289294 | A1 | * | 12/2007 | Werni et al. .................... 60/299 |
| 2009/0208393 | A1 | | 8/2009 | Wenzel et al. |
| 2011/0192676 | A1 | * | 8/2011 | Wirth ............................ 181/227 |
| 2012/0117947 | A1 | * | 5/2012 | Gonze et al. .................... 60/274 |
| 2012/0117949 | A1 | * | 5/2012 | Miebach et al. ................ 60/274 |

FOREIGN PATENT DOCUMENTS

| | | |
|---|---|---|
| DE | 2 307 215 A | 8/1974 |
| DE | 10356000 A1 | 7/2005 |
| DE | 102005025045 A1 | 12/2006 |
| DE | 10 2005 044 494 B3 | 3/2007 |
| DE | 102008022081 A1 | 11/2009 |

\* cited by examiner

*Primary Examiner* — Forrest M Phillips
(74) *Attorney, Agent, or Firm* — Reinhart Boerner Van Deuren P.C.

(57) ABSTRACT

The present invention relates to an exhaust gas treatment device for an exhaust system of an internal combustion engine, more preferably of a road vehicle with a housing, in which at least one exhaust gas treatment element is arranged and mounted by means of a bearing mat and with an outlet pipe which is fluidically connected to an outlet chamber formed in the housing. The risk of a contamination of the bearing mat with water can be reduced with a separating bottom which is arranged in the housing and separates the outlet chamber from a collecting chamber. The separating bottom includes several passage openings through which the outlet chamber is fluidically connected to the collecting chamber and which are each enclosed by a collar protruding into the outlet chamber.

19 Claims, 5 Drawing Sheets

EXHAUST GAS TREATMENT DEVICE

CROSS-REFERENCE TO RELATED PATENT APPLICATIONS

This patent application claims the benefit of German Application No. 10 2010 008 999.0, filed Feb. 24, 2010, the entire teachings and disclosure of which are incorporated herein by reference thereto.

FIELD OF THE INVENTION

The present invention relates to an exhaust gas treatment device for an exhaust system of a combustion engine, particularly of a road vehicle.

BACKGROUND OF THE INVENTION

Exhaust gas treatment devices, such as catalytic converters, particle filters and silencers as well as any combinations thereof, usually comprise a housing in which at least one exhaust gas treatment element, such as for example a catalytic converter element or a particle filter element, is arranged. Insofar as ceramic exhaust gas treatment elements are employed, these are usually mounted in the housing by means of a bearing mat.

With certain installation situations, particularly upon a positioning of the exhaust gas treatment device comparatively closely to a tailpipe of the exhaust system it can happen that water enters the housing of the exhaust gas treatment device. When this happens, water contacting the bearing mat is to be avoided. In addition, particularly with the exhaust system in operation, water contacting the respective exhaust gas treatment element or a sensor if present, particularly a NOX-sensor, can be undesirable since for example high temperature differences can result in high thermal stresses which can cause damage to the exhaust gas treatment device or the respective sensor.

Embodiments of the present invention provide an improved exhaust gas treatment device from the type mentioned at the outset, by reducing the risk of the bearing mat contacting water or other contaminants.

BRIEF SUMMARY OF THE INVENTION

According to the invention, this object is solved through the subject of the independent claim. Advantageous embodiments are the subject of the dependent claims.

Embodiments of the invention are based on the general idea of arranging a separating bottom in the housing, which constructionally separates an outlet chamber from a collecting chamber, wherein passage openings formed in the separating bottom fluidically connect the outlet chamber with the collecting chamber. In addition, collars protruding into the outlet chamber are formed on the separating bottom which enclose the passage openings. Through the proposed design water that can enter the housing via an outlet pipe fluidically connected with the outlet chamber cannot easily enter the collecting chamber through the passage openings of the separating bottom. For the collars, which enclose the passage openings form barriers that cannot be easily breached by water. Thus, should water enter the housing via the outlet pipe it is able to get as far as to the outlet chamber, but not beyond. In particular, because of this, the water does not reach as far as the respective exhaust gas treatment element and particularly not as far as to the associated bearing mat either. In this manner, the risk of water entering the housing contacting the bearing mat can be effectively reduced.

According to an advantageous embodiment, the separating bottom can have a closed region axially aligned with the outlet pipe, whose area is larger than the cross-sectional area of the outlet pipe. Through this it is achieved that water directly dripping from the outlet pipe in the axial direction strikes the closed region, but no passage opening in any event. Thus it can be prevented that water, which directly drips off the outlet pipe, drips through the passage openings.

According to another embodiment, the outlet pipe can comprise a funnel flaring towards the outlet chamber arranged in the housing or merge into such. The funnel reduces the flow resistance at the transition to the outlet pipe and results in an acceleration of the exhaust gas flow.

With a practical further development it can now be provided that the separating bottom axially aligned with the outlet pipe comprises a closed region whose area is larger than the cross-sectional area of the funnel at its end facing the outlet chamber. In this manner the water entering the funnel via the outlet pipe and which can axially drip off now strike the closed region of the separating bottom and because of this not drip through one of the passage openings of the separating bottom.

With another further development a sensor, more preferably a NOX-sensor, can be attached in the region of the outlet pipe or in the region of the funnel namely in such a manner that the sensor between the ends of the outlet pipe or the funnel protrudes into the interior of the outlet pipe or of the funnel. The positioning of the sensor in this position makes possible for example a reliable monitoring of the exhaust gas treatment device.

According to a particularly advantageous further development it can now be provided to fasten the sensor to the housing by means of a sensor bush, wherein this sensor bush penetrates a housing wall and an outlet pipe wall or a funnel wall. Through the sensor bush the sensor protrudes into the interior of the outlet pipe or of the funnel. Practically, this sensor bush can now be equipped with an annular circumferential outer groove in the interior of the outlet pipe or of the funnel. Insofar as on the inside of the outlet pipe or of the funnel along the outer pipe wall or the funnel wall water drains off, this does not directly strike the sensor but the sensor bush, as a result of which the risk of a contamination of the sensor with water is reduced. Insofar as the water would like to continue flowing along the sensor bush in the direction of the sensor the optionally provided outer groove ensures that the water can only spread as far as to the outer groove, then collects therein and drains off from there due to the force of gravity. Insofar water contacting the sensor is effectively avoided.

Further important features and advantages of the invention are obtained from the subclaims, from the drawings and from the corresponding figure description by means of the drawings.

It is to be understood that the features mentioned above and still to be explained in the following cannot only be used in the respective combination stated but also in other combinations or standing alone, without leaving the scope of the present invention.

Other aspects, objectives and advantages of the invention will become more apparent from the following detailed description when taken in conjunction with the accompanying drawings.

BRIEF DESCRIPTION OF THE DRAWINGS

Preferred exemplary embodiments of the invention are shown in the drawing and are explained in more detail in the following description, wherein same reference characters refer to same or similar of functionally same components.

The accompanying drawings incorporated in and forming a part of the specification illustrate several aspects or embodiments of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Corresponding to the FIGS. 1 to 5 an exhaust gas treatment device 1 comprises a housing 2 as well as at least one exhaust gas treatment element 3. The exhaust gas treatment device 1 serves for use in an exhaust system of an internal combustion engine, which more preferably can be arranged in a road vehicle. The exhaust gas treatment device 1 preferably is a catalytic converter or a particle filter, preferentially in combination with a silencer. As catalytic converters, NOX-storage catalytic converters or SCR-catalytic converters are preferably considered. The particle filter preferably is a soot filter. Accordingly, the at least one exhaust gas treatment element 3 preferably is a catalytic converter element, more preferably a NOX-storage catalytic converter element or an SCR-catalytic converter element or a particle filter element, more preferably a soot filter element.

Figure 2:
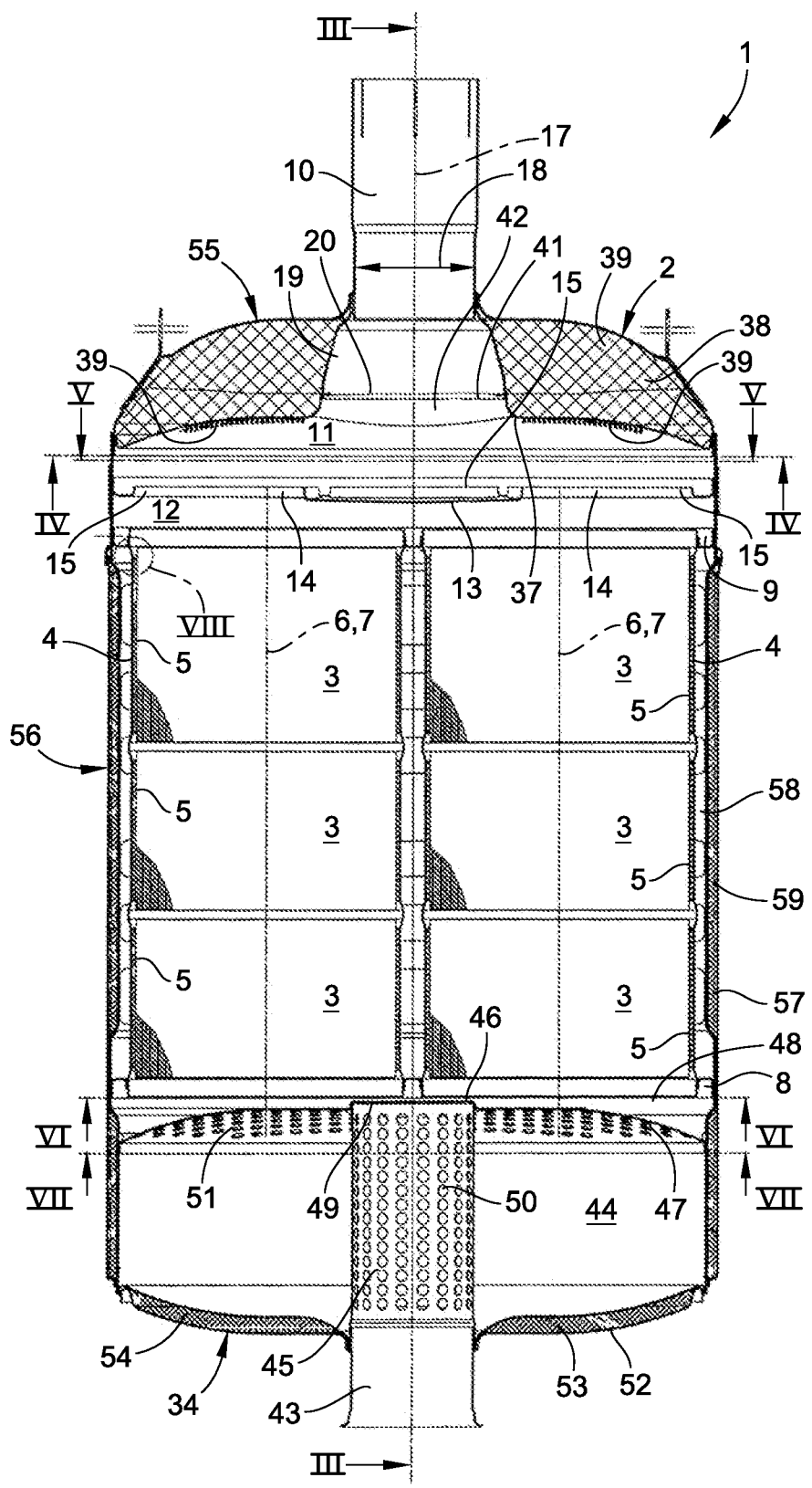
FIG. 2 is a longitudinal section of the exhaust gas treatment device corresponding to the section lines II in FIG. 1.

In the example shown according to FIG. 2 a total of six exhaust gas treatment elements 3 are provided. This quantity however is purely exemplarily and without restriction of the generality. In the shown example, several exhaust gas treatment elements 3 are arranged one after the other in such a manner that they can be subjected to through flow in series. Here, three exhaust gas treatment elements 3 are arranged one after the other in the example. The exhaust gas treatment elements 3 arranged one after the other can practically be arranged in a common element carrier pipe 4. In the example, two such element carrier pipes 4 are provided in each of which three exhaust gas treatment elements 3 are arranged one after the other.

The respective exhaust gas treatment element 3 is mounted in the housing 2 by means of a bearing mat 5. Insofar as, like here, several exhaust gas treatment elements 3 are present, each of these can be mounted in the housing 2 with an own bearing mat 5. Insofar as the exhaust gas treatment elements 3 are accommodated in at least one element carrier pipe 4 the mounting by means of the respective bearing mat 5 takes place within the respective element carrier pipe 4. The bearing mat 5 envelopes the respective exhaust gas treatment element 3 with respect to a longitudinal centre axis 6 of the respective exhaust gas treatment element 3. The longitudinal centre axis of the respective exhaust gas treatment element 3 in this case coincides with a longitudinal centre axis 7 of the respective element carrier pipe 4.

Figure 8:
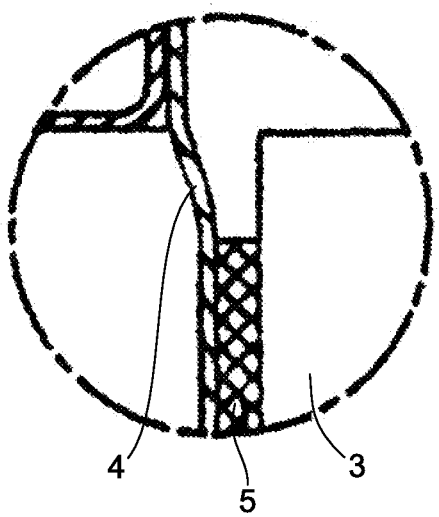
FIG. 8 is a detail VIII from FIG. 2 in an enlarged representation.

The enlarged representation of FIG. 8 clearly shows how the respective exhaust gas treatment element 3 via the respective bearing mat 5 is mounted on the respective carrier element pipe 4 and thus on or in the housing 2.

In the represented exemplary embodiment the respective element carrier pipe 4 is held at its axial ends via a carrying bottom 8 or 9 each in the housing 2. For example, the respective element carrier pipe 4 to this end is inserted in a corresponding receiving opening of the respective carrying bottom 8, 9. Here, the element carrier pipe 4 can be fastened to the one carrying bottom 8 or 9 while it can be mounted axially displaceably on the other carrying bottom 9 or 8 by means of a sliding seat not designated in more detail.

According to FIG. 2, at least two exhaust gas treatment elements 3 can be arranged next to each other in such a manner that they can be subjected to parallel through flow. In the example, two element carrier pipes 4 are provided which are arranged next to each other in such a manner that they can be subjected to parallel through flow. Accordingly, two groups each with exhaust gas treatment elements 3 that can be subjected to through flow in series are arranged next to each other and can thus be subjected to parallel through flow.

Figure 6:
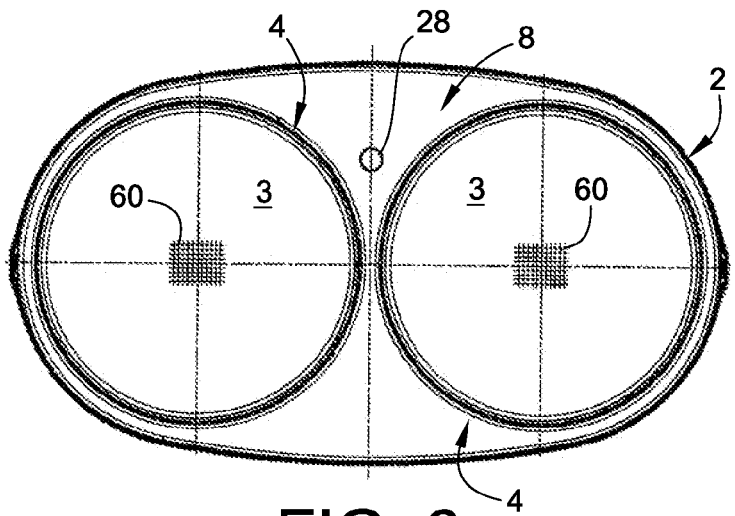
Figure 7:
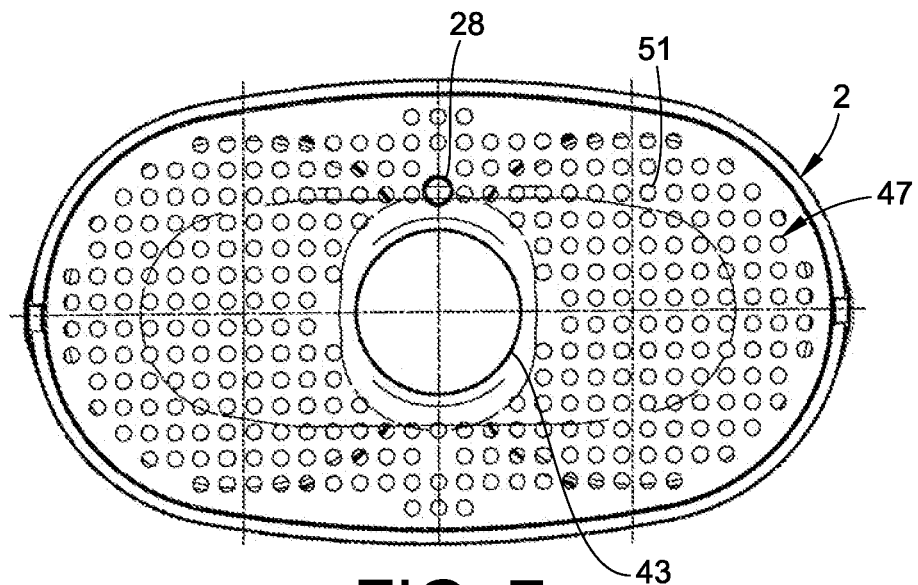

The exhaust gas treatment elements 3 preferably are ceramic bodies, namely more preferably monolithic ceramic bodies. In FIG. 6 a pore structure of the ceramic bodies of the exhaust gas treatment elements 3 is indicated through cross-hatching 60 each.

Figure 1:
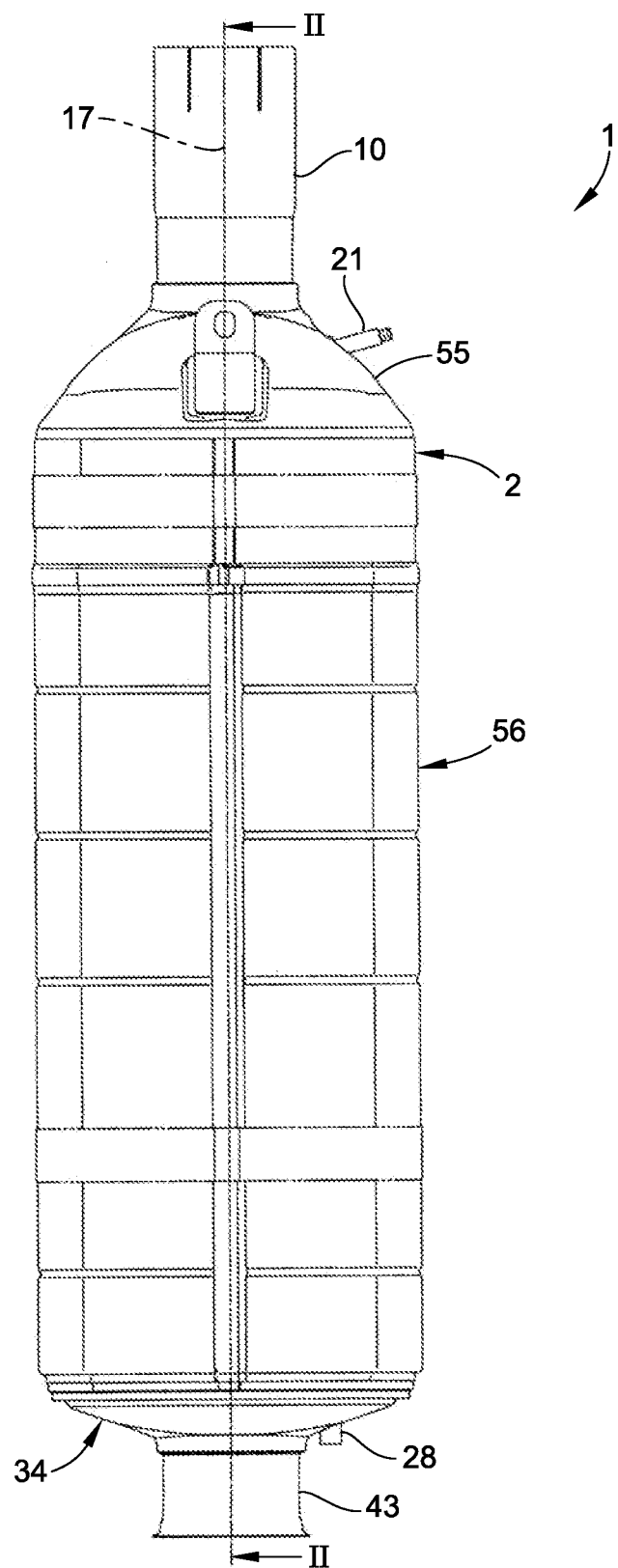
FIG. 1 is a lateral view of an exemplary embodiment of an exhaust gas treatment device according to the teachings of the present invention.
Figure 3:
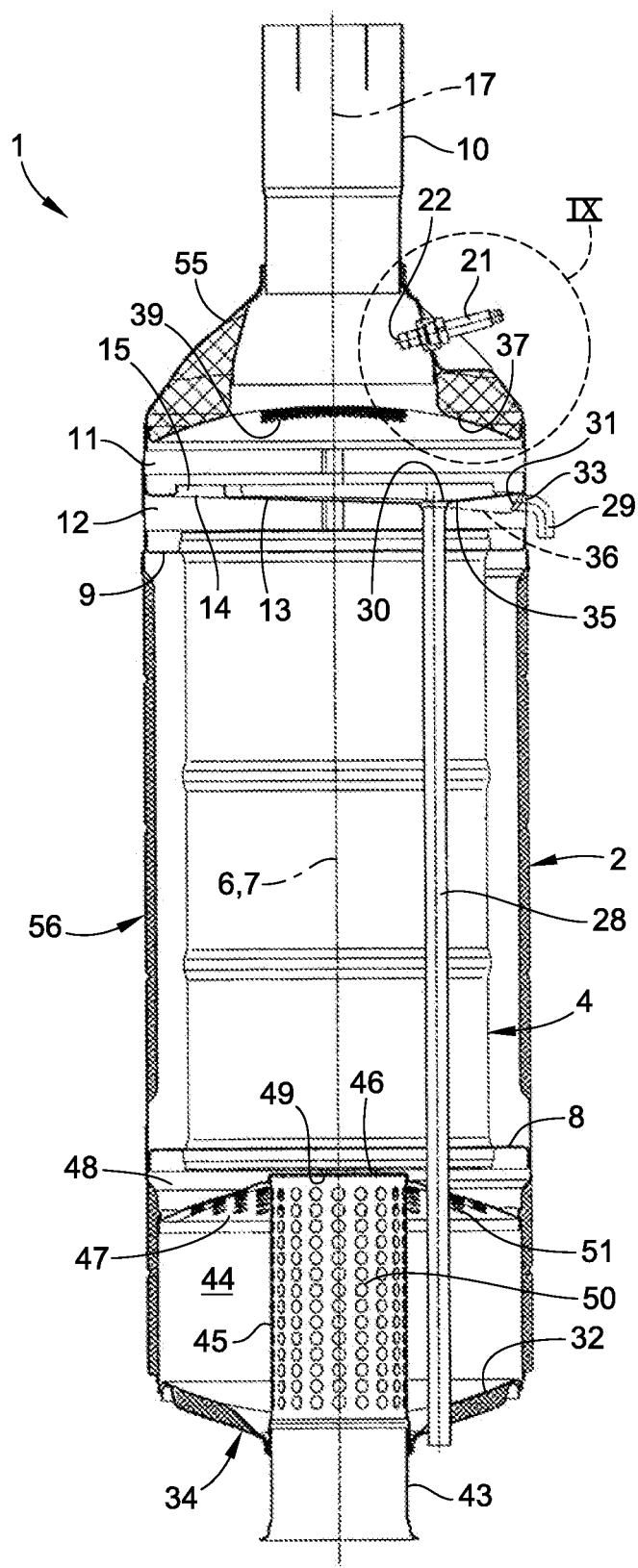
FIG. 3 is a longitudinal section according to the section lines III in FIG. 2 turned by 90° compared with the section from FIG. 2, FIGS. 4-7 are a different cross sections corresponding to section lines IV to VII from FIG. 2.
Figure 4:
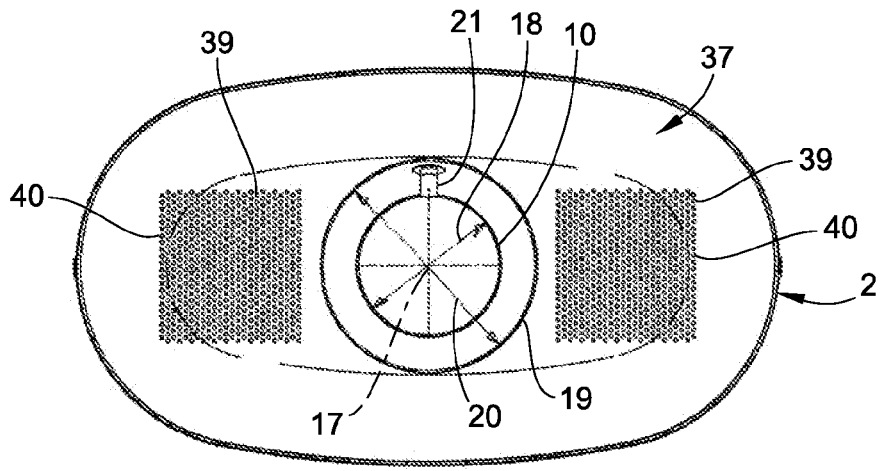
Figure 5:
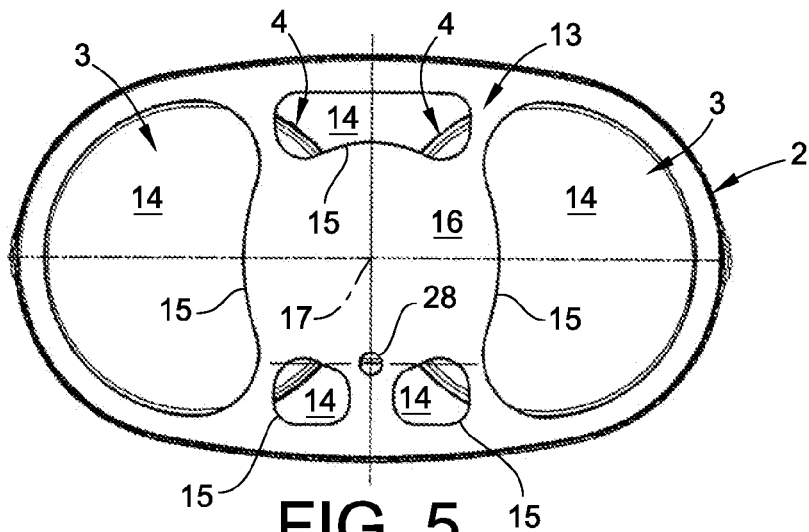

Corresponding to the FIGS. 1 to 3, an outlet pipe 10 is provided on the housing 2, through which exhaust gas can exit the housing 2 with the exhaust system in operation. In the interior of the housing 2 an outlet chamber 11 is provided that is fluidically connected to the outlet pipe 10. In addition, the housing 2 contains a collecting chamber 12 as well as a separating bottom 13, which separates the outlet chamber 11 from the collecting chamber 12. The separating bottom 13 in this case is likewise arranged in the interior of the housing 2. It is equipped with several passage openings 14 through which the outlet chamber 11 is fluidically connected to the collecting chamber 12. In addition, the separating bottom 13 for each passage opening 14 is provided with a ring collar 15 which encloses the respective passage opening 14 and which protrudes into the outlet chamber 11. According to FIG. 5, for example five passage openings 14 can be provided each of which is enclosed by a collar 15. From FIG. 5 it is additionally evident that the separating bottom 13 centrally comprises a closed region 16 in which no passage opening 14 is located. This closed region 16 is arranged aligned with the outlet pipe 10 with respect to an axial direction defined by a longitudinal centre axis 17 of the housing 2. Here, the closed region 16 of the separating bottom 13 is so dimensioned that its area is larger than a cross-sectional area 18 of the outlet pipe 10. Thus, an axial projection of the cross-sectional area 18 of the outlet pipe 10 is entirely located within the closed region 16.

The longitudinal centre axis 17 of the housing 2 in this case extends parallel to the longitudinal centre axis 6 of the respective exhaust gas treatment element 3 and parallel to the longitudinal centre axis 7 of the likewise existing respective element carrier pipe 4.

According to the FIGS. 2 and 3 the outlet pipe 10 according to a preferred embodiment can comprise a funnel 19. In the example, outlet pipe 10 and funnel 19 are separate components which are inserted into each other. Insofar the outlet pipe 10 in this case merges into the funnel 19. The funnel 19 in this case is located within the housing 2 and flares open in the direction towards the outlet chamber 11. The funnel 19 in this case can also form an integral component part of the outlet pipe 10 or like here be attached to the outlet pipe 10. The funnel 19 at its end facing the outlet chamber 11 has a cross-sectional area 20. Preferentially, the closed region 16 of the separating bottom 13 is so dimensioned that its area is also larger than the cross-sectional area 20 of the funnel 19 at the end facing the outlet chamber 11. Thus, an axial projection of this cross-sectional area 20 of the funnel 19 is entirely located within the closed region 16.

Figure 9:
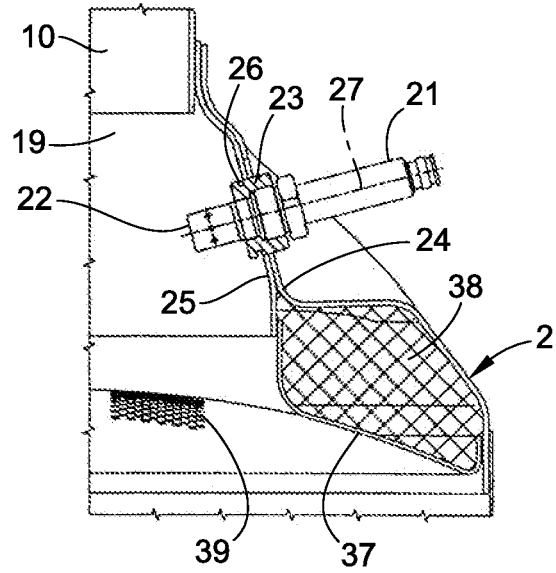
FIG. 9 is a detail IX from FIG. 3 in an enlarged representation.

According to the FIGS. 3 and 9 the exhaust gas treatment device 1 can be equipped with a sensor 21. This can for example be a NOX-sensor. In principle, it can also be a A-sensor or a temperature sensor or the like. Practically, the sensor 21 is attached to the housing 2 in the region of the outlet pipe 10, in this case in the region of the funnel 19. The attachment in this case is performed such that the sensor 21 protrudes into the interior of the funnel 19 between the ends of the funnel 19 not described in any detail. Noticeably, a protruding end 22 of the sensor 21 protrudes into the interior of the funnel 19. For fastening the sensor 21 to the housing 2, a sensor bush 23 is used in the embodiment introduced here. This sensor bush 23 on the one hand penetrates a housing wall 24 and on the other hand a funnel wall 25, each in a corresponding opening not designated in more detail here. The sensor 21 can now protrude through the sensor bush 23 into the interior of the funnel 19. The sensor bush 23 can for example be fastened in a tight manner to the housing wall 24 and/or to the funnel wall 25 by means of a welt seam not represented here. With the advantageous embodiment introduced here the sensor bush 23 is equipped with an outer groove 26 in a portion arranged in the interior of the funnel 19 which with respect to a longitudinal centre axis 27 of the sensor bush 23 circulates annularly. The sensor 21 is orientated coaxially to the longitudinal centre axis 27 and inserted in the sensor bush 23.

According to FIG. 3, the exhaust gas treatment device 1 introduced here practically comprises at least one drain pipe 28 or 29. In the example, two drain pipes 28, 29 are shown which practically are realised only alternatively. In principle however a cumulative realisation is also conceivable. The respective drain pipe 28, 29 on the one hand is connected to a drain opening 30 or 31, while on the other hand it is led through a housing wall 32 or 33 and with respect to the housing 2 is led to the outside. Here it is clear that depending on the realisation of the drain pipes 28, 29 the drain openings 30, 31 as well as the wall lead-throughs 32, 33 are realised alternatively or cumulatively. The one drain pipe 28 is axially led out of the housing distally to the outlet pipe 11, namely more preferably through an end bottom 34 which is located at an end of the housing 2 distant from the outlet pipe 10. The housing wall 32, through which this drain pipe 28 is led through the housing to the outside in this case is formed by said end bottom 34. The other drain pipe 29 exemplarily shown here is laterally led out of the housing 2 in the region of the separating bottom 13, that is transversely to the longitudinal centre axis 17 of the housing 2. The realisation of the drain pipes 28, 29 shown here can depend on the installation space available in the housing 2 and on the installation situation of the exhaust gas treatment device 1 within the exhaust system or on the vehicle. Preferred is a standing or hanging positioning of the housing 2 in the respective insulation state of the exhaust gas treatment device 1. With a standing or hanging insulation situation the longitudinal centre axis 17 of the housing 2 substantially extends vertically. In this case a standing arrangement should still be present if the longitudinal centre axis 17 deviates from the vertical direction with an angle of up to 45°.

According to FIG. 3, the one drain pipe 28 is configured in a straight line. More preferably, it extends parallel to the longitudinal centre axis 17, wherein it is practically led through the housing 2 between the element carrier pipes 4. More preferably, this drain pipe 28 is led through the carrying bottoms 8, 9 as well as through the intermediate bottom 47.

Practically, the separating bottom 13 comprises a trough 35 and 36 respectively for the respective drain opening 30 and 31 respectively. The trough 35 is assigned to the drain opening 30 of the one drain pipe 28 while the trough 36 is assigned to the drain opening 31 of the other drain pipe 29. The respective trough 35, 36 is arranged positioned low in the installation state of the exhaust gas treatment device 1 so that the water collects on the side of the separating bottom 13 facing the outlet chamber 11, due to gravitational force flows to the respective trough 35, 36 where it enters the respective drain pipe 28, 29 through the respective drain opening 30, 31 and is led out of the housing 2 through said drain pipe.

According to FIGS. 1 and 2 a separating bottom 37 can be arranged in the housing 2 which separates the outlet chamber 11 from an absorption chamber 38. The separating bottom 37 is configured permeable to airborne sound. More preferably, to this end, it can be provided with a perforation 39. In the sectional representation represented in FIG. 4 two perforated regions 40 are noticeable. In the absorption chamber 38 a sound-absorbing material can be arranged. Practically the funnel 19 merges into the separating bottom 37. More preferably, an inlet opening 41 of the funnel 19 can be formed on the separating bottom 37. In the example, the separating bottom 37 has a pull-out 42 in which the funnel 19 with its flared-open cross section 20 is inserted.

At an end distant from the outlet pipe 10 the housing 2 comprises an inlet pipe 43. Noteworthy here is the coaxial alignment of the inlet pipe 43 to the outlet pipe 10 provided here. The inlet pipe 43 protrudes into an expansion chamber 44 which is arranged in the housing 2. In this expansion chamber 44 the inlet pipe 43 comprises a perforated end portion 45 which is closed at its axial end 46. Here, the axial end 46 of the inlet pipe 43 can be closed by an intermediate bottom 47 which separates the expansion chamber 44 from a distribution chamber 48. To this end, a trough 49 can be more preferably moulded on the intermediate bottom 47 which trough has a closed surface. The trough 49 is matched to the cross section of the inlet pipe 43 or of the perforated end portion 45 so that said end portion 45 with its axially open end 46 can dip into the trough 49 and be axially closed as a result.

The perforated end portion 45 has a perforation 50 which is configured such that the expansion pipe 43 is fluidically connected to the expansion chamber 44. More preferably, the openings of the perforation 50 are dimensioned clearly larger than the openings of the perforation 39. The intermediate bottom 47 is also equipped with a perforation 51 which is dimensioned so that it fluidically connects the expansion chamber 44 to the distribution chamber 48.

The end bottom 34, through which the inlet pipe 43 protrudes into the expansion chamber 44, with the special embodiment shown here, is of the double-walled design and accordingly comprises an outer shell 52 and an inner shell 53. More preferably, an insulating filling 54 can be arranged between outer shell 52 and inner shell 53 which has a thermally and/or acoustically insulating effect. In contrast with this, an end bottom 55 arranged in the region of the outlet pipe 10 can be simply embodied. The insulating effect in this case is realised through the absorption chamber 38 or through the sound-absorbing material 39 introduced therein.

Between the end bottoms 34 and 55 the housing 2 comprises a jacket 56 which circulates in circumferential direction with respect to the longitudinal centre axis 17. It can, as shown here, at least in portions be configured in a double-walled manner and accordingly comprise an outer skin 57, an inner skin 58 and if applicable an insulating layer 59 arranged between outer skin 57 and inner skin 58, which has a thermally and/or acoustically insulating or damping effect.

The exhaust gas treatment device 1 according to the invention works as follows:

With the exhaust system in operation, exhaust gas enters the housing 2 via the inlet pipe 43. Through the perforation 5 of the end portion 45 the exhaust gas reaches the expansion chamber 44. In the process, a sound-damping effect occurs. From the expansion chamber 44 the exhaust gas reaches the distribution chamber 48 through the perforation 51 of the intermediate bottom 47, from where the exhaust gas flows parallel through the two element carrier pipes 4 and therein one after the other also through the exhaust gas treatment elements 3 provided therein. Following this, the exhaust gas reaches the collecting chamber 12 and from there the outlet chamber 11 via the passage openings 14 of the separating bottom 13. From there airborne sound can reach the absorption chamber 38 through the perforation 39. The exhaust gas via the funnel 19 enters the outlet pipe 10 and above this exits the housing 2.

With the shown insulation position water can enter the housing 2 via the outlet pipe 10. Here, the water can drain off for example along the wall of the outlet pipe 10 to the bottom and drip downwards from a face edge of the outlet pipe 10. Here, the dripping-off water strikes the closed region 16 of the separating bottom 13. The collars 15 protruding into the outlet chamber 11 prevent that water reaches the collecting chamber 12 through the passage openings 14 and from there for example the bearing mats 5. The water collects on the separating bottom 13 and due to the force of gravity flows to the respective trough 35 or 36 and—as already explained further up—through the respective outlet opening 30, 31 and through the respective outlet pipe 28, 29 out of the housing 2.

The same applies also to water which from the outlet pipe 10 initially reaches the wall of the funnel 19 and drips off at the face end of the funnel 19 in the direction of the separating bottom 13 where it again meets the closed region 16. Water draining along the funnel 19 can strike the sensor bush 23 in the region of the sensor 21. However, the water cannot reach as far as to the sensor 21 along the sensor bush 23 since it enters the outer groove 26 beforehand and via said groove is discharged downwards and can drip off from said groove again or further drain along the funnel wall 25.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An exhaust gas treatment device for an exhaust system of an internal combustion engine, particularly of a road vehicle, comprising:
   a housing, in which at least one exhaust gas treatment element is located and mounted by means of a bearing mat;
   an outlet pipe that is fluidically connected to an outlet chamber formed in the housing;
   a separating bottom that is arranged in the housing and separates the outlet chamber from a collecting chamber; and
   wherein the separating bottom comprises several passage openings through which the outlet chamber is fluidically connected to the collecting chamber and which are each enclosed by a collar protruding into the outlet chamber.

2. The exhaust gas treatment device according to claim 1, wherein the separating bottom axially aligned with the outlet pipe comprises a closed region whose area is larger than the cross-sectional area of the outlet pipe on an end facing the separating bottom.

3. The exhaust gas treatment device according to claim 1 wherein the outlet pipe via a funnel flaring open towards the outlet chamber arranged in the housing merges into the outlet chamber.

4. The exhaust gas treatment device according to claim 1 wherein the separating bottom axially aligned with the outlet pipe has a closed region whose area is larger than the cross-sectional area of the funnel at its end facing the outlet chamber.

5. The exhaust gas treatment device according to claim 1, wherein a sensor, more preferably a NOX-sensor, is attached to the housing in the region of the outlet pipe or in the region of the funnel, so that the sensor between the ends of the outlet pipe or between the ends of the funnel protrudes into the interior of the outlet pipe or into the interior of the funnel.

6. The exhaust gas treatment device according to claim 5, wherein the sensor is fastened to the housing by means of a sensor bush, which more preferably penetrates a housing wall and an outlet pipe wall or a funnel wall, wherein the sensor protrudes through the sensor bush into the interior of the outlet pipe or of the funnel.

7. The exhaust gas treatment device according to claim 6, wherein the sensor bush in the interior of the outlet pipe or in the interior of the funnel comprises an annular circumferential outer groove.

8. The exhaust gas treatment device according to claim 1, wherein at least one drain pipe is provided, which on the one hand is connected to a drain opening formed in the separating bottom and on the other hand is led to the outside through a housing wall.

9. The exhaust gas treatment device according to claim 8, wherein the drain pipe distally to the outlet pipe is axially led out of the housing or in that the drain pipe in the region of the separating bottom is laterally led out of the housing.

10. The exhaust gas treatment device according to claim 8, characterized in that the drain opening is arranged in a trough formed in the separating bottom, which in the installation state of the exhaust gas treatment device is arranged in a low position.

11. The exhaust gas treatment device according to claim 1, wherein in the housing a separating bottom which is permeable to airborne sound, more preferably perforated, is arranged, which separates an absorption chamber from the outlet chamber.

12. The exhaust gas treatment device according to claim 11, wherein an inlet opening of the outlet pipe or of the funnel is formed on the separating bottom.

13. The exhaust gas treatment device according to claim 1, wherein an inlet pipe in an expansion chamber formed in the housing comprises an axially closed, perforated end portion whose perforation fluidically connects the inlet pipe to the expansion chamber.

14. The exhaust gas treatment device according to claim 13, wherein a perforate intermediate bottom separates the expansion chamber from a distribution chamber formed in the housing, whose perforation fluidically connects the expansion chamber to the distribution chamber.

15. The exhaust gas treatment device according to claim 1, wherein several exhaust gas treatment elements are arranged one after the other so that they can be subjected to through flow in series.

16. The exhaust gas treatment device according to claim 1, wherein at least one exhaust gas treatment element is arranged in an element carrier pipe and mounted with the respective bearing mat.

17. The exhaust gas treatment device according to claim 6, wherein the element carrier pipe at its end via a carrying bottom each is held in the housing.

18. The exhaust gas treatment device according to claim 1, wherein at least two exhaust gas treatment elements are arranged next to each other so that they can be subjected to parallel through flow.

19. The exhaust gas treatment device according to claim 16, wherein at least two element carrier pipes are arranged next to each other so that they can be subject to parallel through flow.

* * * * *